United States Patent
Glasgow et al.

(10) Patent No.: US 11,756,092 B2
(45) Date of Patent: Sep. 12, 2023

(54) FLAW ANALYSIS OF IMAGES

(71) Applicant: eBay Inc., San Jose, CA (US)

(72) Inventors: Dane Glasgow, San Jose, CA (US);
David Eramian, San Jose, CA (US);
Sandy Godsey, San Jose, CA (US);
Justin VanWinkle, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 127 days.

(21) Appl. No.: 17/375,207

(22) Filed: Jul. 14, 2021

(65) Prior Publication Data

US 2021/0342908 A1 Nov. 4, 2021

Related U.S. Application Data

(63) Continuation of application No. 16/400,759, filed on May 1, 2019, which is a continuation of application
(Continued)

(51) Int. Cl.
*G06Q 30/0601* (2023.01)
*G06T 7/00* (2017.01)
(Continued)

(52) U.S. Cl.
CPC ......... *G06Q 30/0619* (2013.01); *G06F 18/24* (2023.01); *G06Q 30/0609* (2013.01);
(Continued)

(58) Field of Classification Search
CPC combination set(s) only.
See application file for complete search history.

(56) References Cited

U.S. PATENT DOCUMENTS 6,990,255 B2 1/2006 Romanik et al.
7,617,128 B2 11/2009 Greak
(Continued)

FOREIGN PATENT DOCUMENTS

CN 107451868 A 12/2017
CN 107808325 A 3/2018
(Continued)

OTHER PUBLICATIONS

Final Office Action Received for Korean Patent Application No. 10-2020-7025507 dated Aug. 30, 2021, 4 pages (1 page of English translation and 3 pages of official copy).
(Continued)

*Primary Examiner* — William J Allen
(74) *Attorney, Agent, or Firm* — FIG. 1 Patents (57) ABSTRACT

Systems and methods are disclosed to provide flaw accentuation to an image in an e-commerce online marketplace. In some embodiments, a method may include receiving at an online marketplace, from a seller through the Internet, an image of an item being listed for sale at the online marketplace and text related to the item being listed for sale; determining that the item includes a flaw based on the text related to the item being listed for sale or the image of the item; creating a flaw accentuation to the image; and creating a listing in the online marketplace for the item that includes the image and the flaw accentuation to the image.

20 Claims, 6 Drawing Sheets

Related U.S. Application Data

No. 14/986,486, filed on Dec. 31, 2015, now Pat. No. 10,319,014.

(51) Int. Cl.
  *G06V 30/416* (2022.01)
  *G06F 18/24* (2023.01)
  *G06T 5/00* (2006.01)

(52) U.S. Cl.
  CPC ..... *G06Q 30/0613* (2013.01); *G06Q 30/0643* (2013.01); *G06T 5/00* (2013.01); *G06T 7/00* (2013.01); *G06T 7/0002* (2013.01); *G06V 30/416* (2022.01)

(56) References Cited

U.S. PATENT DOCUMENTS

| | | | |
|---|---|---|---|
| 7,921,052 | B2 | 4/2011 | Dabney et al. |
| 8,452,691 | B2 | 5/2013 | Macdonald et al. |
| 8,635,124 | B1 | 1/2014 | Hamilton et al. |
| 10,319,014 | B2 | 6/2019 | Glasgow et al. |
| 10,783,585 | B1 | 9/2020 | Banerjee et al. |
| 11,100,550 | B2 | 8/2021 | Glasgow et al. |
| 2003/0053713 | A1 | 3/2003 | Romanik et al. |
| 2004/0128224 | A1 | 7/2004 | Dabney et al. |
| 2005/0289039 | A1 | 12/2005 | Greak et al. |
| 2007/0057815 | A1 | 3/2007 | Foy et al. |
| 2008/0059281 | A1 | 3/2008 | Tower et al. |
| 2008/0133305 | A1 | 6/2008 | Yates et al. |
| 2010/0114736 | A1 | 5/2010 | Lewis et al. |
| 2010/0169180 | A1 | 7/2010 | Arasu et al. |
| 2010/0262495 | A1 | 10/2010 | Dumon et al. |
| 2011/0145713 | A1 | 6/2011 | Williams et al. |
| 2011/0161182 | A1* | 6/2011 | Racco ............... G06Q 30/0277 705/26.1 |
| 2011/0270717 | A1 | 11/2011 | Macdonald et al. |
| 2014/0100988 | A1 | 4/2014 | Marx |
| 2014/0143090 | A1 | 5/2014 | Deyle et al. |
| 2014/0172611 | A1 | 6/2014 | Kaushik et al. |
| 2014/0180861 | A1 | 6/2014 | Basavaiah |
| 2015/0025993 | A1 | 1/2015 | Kiglies et al. |
| 2015/0286898 | A1 | 10/2015 | Di et al. |
| 2015/0325023 | A1* | 11/2015 | Gross ................. G06V 40/161 382/203 |
| 2016/0092472 | A1 | 3/2016 | Feder et al. |
| 2017/0193594 | A1 | 7/2017 | Glasgow et al. |
| 2019/0259075 | A1 | 8/2019 | Glasgow et al. |

FOREIGN PATENT DOCUMENTS

| | | |
|---|---|---|
| JP | 2009-509232 A | 3/2009 |
| KR | 10-2002-0039198 A | 5/2002 |
| KR | 10-2011-0062185 A | 6/2011 |
| WO | 2003/009520 A1 | 1/2003 |
| WO | 2017/116809 A1 | 7/2017 |

OTHER PUBLICATIONS

Trial Board's decision received for Korean Patent Application No. 10-2020-7025507, dated Nov. 11, 2021, 1 Page (Official Copy Only).
Brief Communication received for European Patent Application No. 16882357.3, dated Sep. 22, 2021, 9 Pages.
EPO Decision To refuse Received for European Patent Application No. 16882357.3, dated Nov. 18, 2021, 24 Pages.
Office Action received for Chinese Patent Application No. 201680077470.5, dated Oct. 11, 2021,7 Pages(1 Page of English Translation & 6 Pages of Official Copy).
Forensic Science, Forensic analysis legal definition of Forensic analysis, Retrieved from internet URL: https://legal-dictionary.thefreedictionary.com/Forensic+analysis, Accessed on Sep. 2, 2021, 4 Pages.
Office Action Received for Korean Patent Application No. 10-2018-7018282, dated Jan. 29, 2020,12 pages (6 Pages of Official Copy and 6 Pages of Official Copy).
Final Office Action received for Korean Patent Application No. 10-2020-7025507, dated Jun. 29, 2021, 4 Pages(1 Page of English translation & 3 Pages of official Copy).
Office Action Received for Korean Patent Application No. 10-2020-7025507, dated Dec. 3, 2020, 6 pages(1 Page of English Translation & 5 Pages of Official Copy).
Non-Final Office Action received for U.S. Appl. No. 14/986,486, dated Aug. 28, 2018, 13 pages.
Notice of Allowance received for U.S. Appl. No. 14/986,486, dated Feb. 6, 2019, 11 pages.
Restriction Requirement received for U.S. Appl. No. 14/986,486, dated Jan. 22, 2018, 8 pages.
Restriction Requirement Received for U.S. Appl. No. 14/986,486 dated May 11, 2018, 8 pages.
Non-Final Office Action Received for U.S. Appl. No. 16/400,759, dated Oct. 30, 2020,22 pages.
Notice of Allowance Received for U.S. Appl. No. 16/400,759, dated Apr. 13, 2021, 7 pages.
Communication Pursuant to Article 94(3) EPC received For European Patent Application No. 16882357.3, dated Feb. 26, 2020, 10 Pages.
Extended European Search Report Received for European Patent Application No. 16882357.3, dated May 6, 2019, 9 pages.
Summons To Attend Oral Proceeding Received for European Patent Application No. 16882357.3, dated Apr. 26, 2021, 14 pages.
Gaussian,"Image Sharpening", Biomedical & Pharmacology Journal, vol. 7(2), 707-713, Butterworth High Pass Filter Ayush Dogra and Parvinder Shalla Department of ECE, Maharishi Markandeshwar University, Mullana, Ambala, India, 2014, 7 pages.
International Preliminary Report on Patentability received for PCT Application No. PCT/US2016/067589, dated Jul. 12, 2018, 7 pages.
International Search Report received for PCT Patent Application No. PCT/US2016/067589, dated Apr. 14, 2017, 4 pages.
Written Opinion received for PCT Patent Application No. PCT/US2016/067589, dated Apr. 14, 2017, 5 pages.
Decision for Appeal against Final Rejection Received for Korean Patent Application No. 2020-7025507 dated Mar. 30, 2022, 33 Pages (28 pages official copy & 5 pages claims in English).
Notice of Decision to Grant received for Chinese Patent Application No. 201680077470.5 dated Sep. 5, 2022, 7 Pages (2 Pages of English Translation & 5 Pages of Official Copy).
Office Action received for Korean Patent Application No. 10-2021-7031386, dated Jan. 11, 2022, 5 Pages (1 Page of English Translation & 4 pages of Original Document Only).
Office Action received for Korean Patent Application No. 10-2021-7031386, dated Mar. 30, 2023, 5 Pages (1 Page of English Translation & 4 pages of Original Document).
Office Action received for Korean Patent Application No. 10-2021-7031386, dated Sep. 29, 2022, 7 Pages (1 Page of English Translation & 6 pages of Original Document).

\* cited by examiner

Figure 6

FLAW ANALYSIS OF IMAGES

CROSS-REFERENCE TO RELATED APPLICATIONS

This application is a continuation of U.S. patent application Ser. No. 16/400,759, filed on May 1, 2019, which application is a continuation of U.S. patent application Ser. No. 14/986,486, filed on Dec. 31, 2015, issued as U.S. Pat. No. 10,319,014; the disclosures of which are incorporated herein by reference in their entireties.

TECHNICAL FIELD

This disclosure relates generally to flaw analysis of images.

BACKGROUND

E-commerce has become ubiquitous. In addition to brick and mortar establishments, consumers can purchase goods and services from e-commerce retailers from their computer and/or mobile device. E-commerce has its drawbacks. In some cases consumers are unable to deal directly with a salesperson, which may lower the level of trust in a potential transaction or purchase. The distance between buyers and sellers and the anonymity of sellers may limit a buyer's ability to resolve issues with a product or service after purchase, which may also lower trust in the engagement.

Many of these issues may be exacerbated when the seller is not associated with the online marketplace where the goods or services are listed for sale. For instance, in some online marketplaces sellers are able to list items for sale (or auction) through the online marketplace and may be charged a fee by the online marketplace for this service. Once the buyer purchases the goods or services, the seller may deliver the goods or services. This arm's length relationship between the buyer and the seller can lead a buyer to be more distrustful of a seller in an online marketplace and/or in e-commerce. Providing e-commerce tools and/or resources that show the trustworthiness of the seller can increase the likelihood that a transaction may be completed.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are disclosed to determine whether an item being listed for sale in an online marketplace is flawed. In some embodiments, a method may receive at the online marketplace an image of an item being listed for sale at the online marketplace; provide a user interface to the seller that allows the seller to indicate whether the item has one or more flaws; provide the user with one or more digital flaw accentuation tools through the first user interface; receive through the user interface a flaw accentuation to the image that is based on an interaction between the user and a flaw accentuation tool; and create a listing in the online marketplace for the item that includes the image and an application of the flaw accentuation to the image These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

Systems and methods are disclosed to perform flaw analysis on images provided as part of an item listing in an online marketplace. In some embodiments, a presentation may be made to a potential buyer that includes accentuations or identification of a flaw within one or more images provided by the seller. In some embodiments, a flaw analysis may be performed that may include both an implicit flaw analysis and an explicit flaw analysis. In some embodiments, the results of the flaw analysis may be used as part of a ranking system for the item listing and/or may be used to penalize sellers that do not report flaws in their items.

Some embodiments may be used to increase buyer satisfaction and/or increase the appearance of seller trustworthiness by providing opportunities for a seller to disclose and/or present flaws in an item listed for sale. In addition, some embodiments may be useful to an online marketplace to motivate sellers to identify and/or present flaws to potential sellers to potentially increase both trustworthiness and increase conversion. Such embodiments may help e-commerce and/or online marketplaces overcome many challenges.

A flaw may include, for example, a scratch, chip, dent, fold, crack, water damage, stain, chip, bend, discoloration, fading, hole, ink stain, gouge, etc. A flaw may be any damage to an item that makes the item less than new or puts the item in a condition that a user would recognize as not being new.

In online marketplaces where sellers may sell used items, the integrity of the online marketplace may depend at least in part on the level of trust a buyer may have with a seller. The more open the seller is about the item listed for sale, for example, the more trust the buyer may have with the seller, which may translate into a buyer being more likely to purchase an item from the seller. Sellers that provide an open and honest description of the flaws of an item being listed for sale are more likely to be trusted than those that don't. A flaw analysis and/or presentation as discussed in this document may provide an avenue to increase the trust between buyers and sellers, which may result in a higher rate of sales between buyer and sellers.

Figure 1:
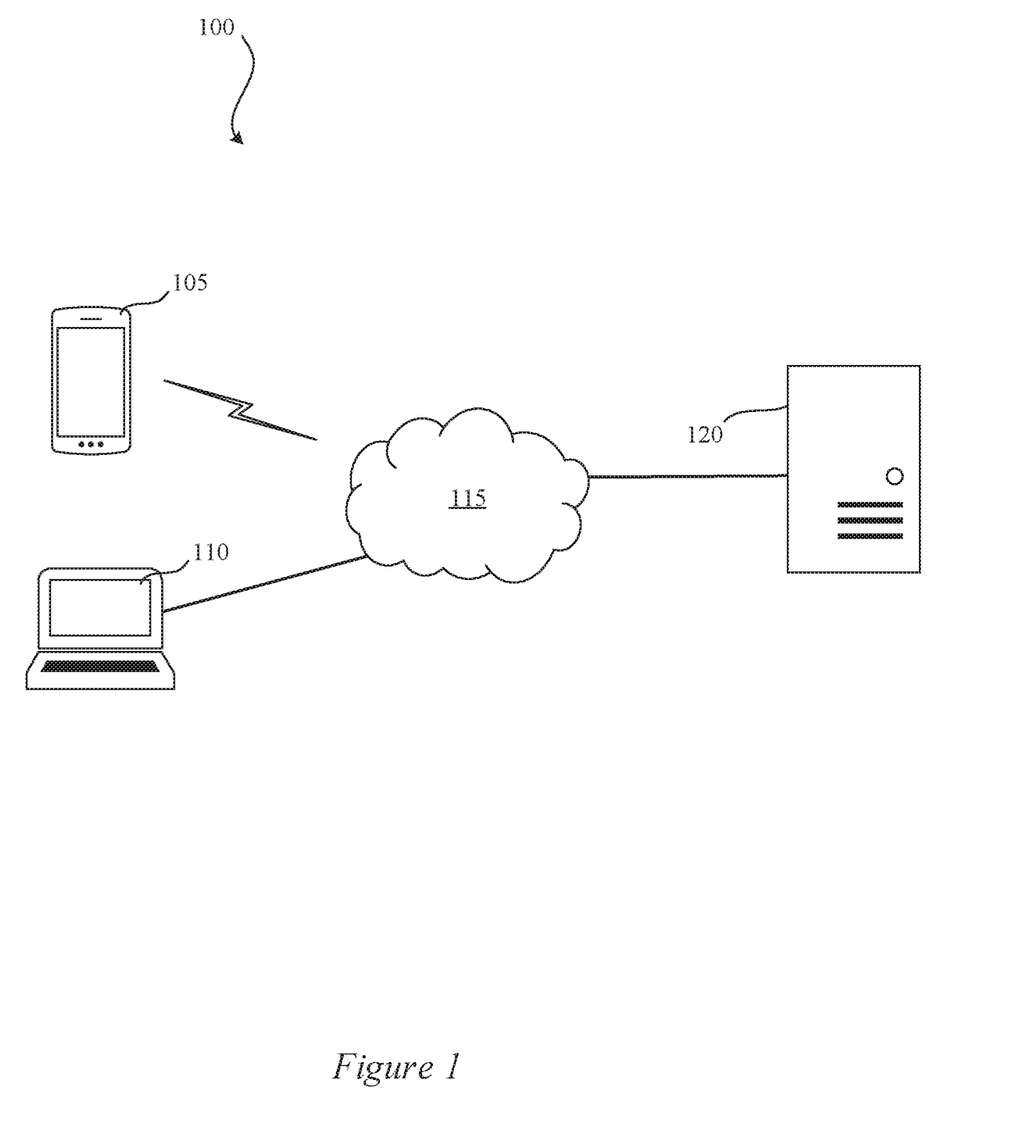
FIG. 1 illustrates an example architecture in which a user may interact with the e-commerce website according to some embodiments.

FIG. 1 illustrates an example architecture 100 in which a user (either or both a seller or a buyer) may interact with an e-commerce website. The user may access an e-commerce website, for example, using a user device that may include a mobile device 105 or a computer 110. The user device, for example, may include a smart phone, a tablet, a laptop computer, a desktop computer, a smart watch, or some combination thereof. The user device may be coupled or connected to the network 115 either through a wired or wireless connection.

The e-commerce website may be hosted or maintained by a server 120, which may include one or more servers distributed locally or broadly. In some embodiments, the server 120 may be a cloud based server system that may include a plurality of servers located at various locations and connected through a network. A website hosted by the server 120 may provide one or more representations of items as an item listing that may be purchased by a user. Images of these items as well as text describing these items may be sent to a user device through the network 115 in order to provide the item listing in the website. Users may view the images and text using a web browser, an application, or an app on user devices. The website may provide a marketplace whereby users may shop for and purchase items listed as item listings in the marketplace.

The network 115 may be any network or configuration of networks configured to send and receive communications between devices. In some embodiments, the network 115 may include a conventional type network, a wired or wireless network, and may have numerous different configurations. Furthermore, the network 115 may include a local area network (LAN), a wide area network (WAN) (e.g., the Internet), or other interconnected data paths across which multiple devices and/or entities may communicate. In some implementations, the network 115 may include a peer-to-peer network. The network 115 may also be coupled to or may include portions of a telecommunications network for sending data in a variety of different communication protocols. In some implementations, the network 115 includes Bluetooth® communication networks or a cellular communications network for sending and receiving communications and/or data including via short message service (SMS), multimedia messaging service (MMS), hypertext transfer protocol (HTTP), direct data connection, wireless application protocol (WAP), e-mail, etc. The network 115 may also include a mobile data network that may include third-generation (3G), fourth-generation (4G), long-term evolution (LTE), long-term evolution advanced (LTE-A), Voice-over-LTE ("VoLTE") or any other mobile data network or combination of mobile data networks. Further, the network 115 may include one or more IEEE 802.11 wireless networks.

The server 120 may store information for an item listing. This information may include, for example, text describing the item listed for sale in the item listing, one or more images of the item listed for sale in the item listing, links or buttons that may be selected to purchase the item, etc. The server 120 may also include a database that includes information about all the items listed for sale or previously listed for sale in the marketplace. The database may include statistical data about the likelihood that one item, type of item, or category of item will likely have flaws and/or the type of flaws the item may likely have.

Figure 2:
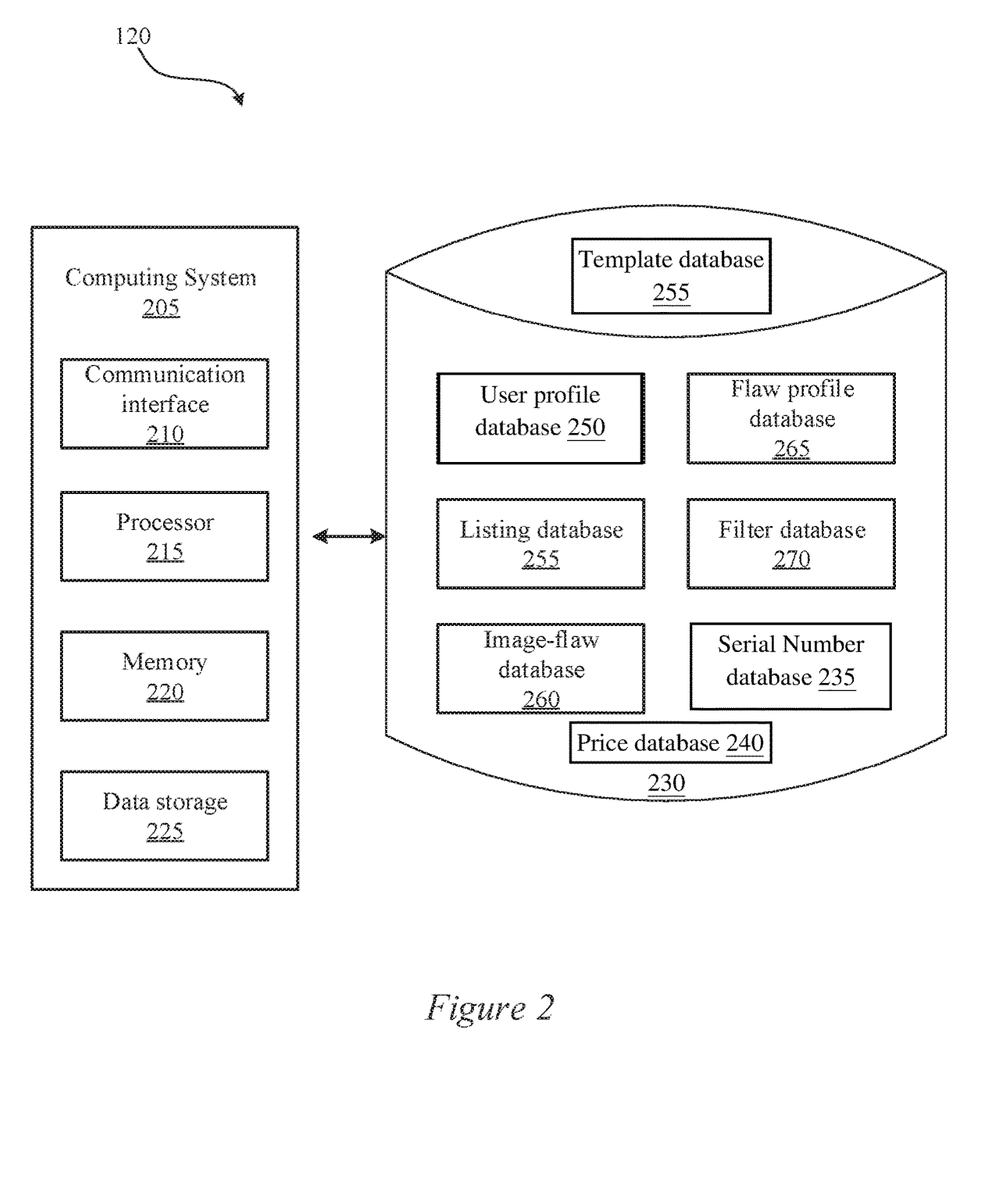
FIG. 2 illustrates a block diagram of some components of the electronic marketplace according to some embodiments.

FIG. 2 illustrates a block diagram of a system 115 of some components of the server 120 according to some embodiments described herein. The server 120 may be arranged in accordance with at least one embodiment described herein. The server 120 may include computing system 205 and database 230. The computing system 205 may include a communication interface 210, a processor 215, a memory 220, and data storage 225. One or more of the communication interface 210, the processor 215, the memory 220, and the data storage 225 may be communicatively coupled.

In some embodiments, the communication interface 210 may be used by the computing system 205 to communicate with the network 115 and/or the mobile device 105 of FIG. 1. In some embodiments, the communication interface 210 may communicate with the network 115 and/or the mobile device 105 using any communication protocol, interface, standard, etc. In some embodiments, the communication interface 210 may communicate with the network 115 and/or the mobile device 105 using a wired or wireless connection.

In some embodiments, the processor 215 may include any suitable special-purpose or general-purpose computer, computing entity, or processing device including various computer hardware or software modules and may be configured to execute instructions stored on any applicable computer-readable storage media. For example, the processor 215 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, it is understood that the processor 215 may include any number of processors configured to perform individually or collectively any number of operations described herein. Additionally, one or more of the processors may be present on one or more different electronic devices, such as different servers. In some embodiments, the processor 215 may interpret and/or execute program instructions and/or process data stored in the memory 220, the data storage 225, or the memory 220 and the data storage 225. In some embodiments, the processor 215 may fetch program instructions from the data storage 225 and/or the database 230 and load the program instructions in the memory 220. After the program instructions are loaded into the memory 220, the processor 215 may execute the program instructions.

In some embodiments, the memory 220 and the data storage 225 may include computer-readable storage media for carrying or having computer-executable instructions or data structures stored thereon. Such computer-readable storage media may be any available media that may be accessed by a general-purpose or special-purpose computer, such as the processor 215. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 215 to perform a certain operation or group of operations.

In some embodiments, the database 230 may be communicatively coupled with the computing system 205. The database 230 may include one or more other databases such as, for example, a serial number database 235, a price database 240, a user profile database 250, a listing database 255, a template database 255, an image-flaw database 260, a filter database 270, and a flaw profile database 265. The database 230 may also include multiple modules, that when executed by the processor 215, may cause the computing system 205 to perform operations that may create a listing for the mobile device 105 based on metadata received from the mobile device 105.

In some embodiments, the database 230 may include computer-readable storage media for carrying or having computer-executable instructions or data structures stored thereon. Such computer-readable storage media may be any available media that may be accessed by a general-purpose or special-purpose computer, such as the processor 215. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 215 to perform a certain operation or group of operations.

In some embodiments, the user profile database 250 may include information related to various users of the electronic marketplace. For each user, this information may include, for example, demographic data, which may include, the age, gender, ethnicity, among other data, a user location, a shopping history, a purchasing history, items most recently viewed, items most recent items purchased, items most recent items placed in a virtual shopping cart but not purchased, preferred shipping options, credit card information, listing information, an address, a telephone number, flaw history, etc.

In some embodiments, the user profile database 250 may also include listing preferences for users. The listing preferences of a user may include auction preferences, auction duration preferences, shipping preferences, store front graphics, store name, user name, comments, ratings, payment preference, flaw display preferences, or some combination thereof.

In some embodiments, the listing database 255 may include listings of products listed for sale in the server 120. The listing database 255 may also include listings of products that have been created but not published. The listing database 255 may include the description of items listed for sale and/or items previously listed for sale. In some embodiments, the listing database 255 may reference images stored in the image-flaw database 260.

In some embodiments, the image-flaw database 260 may include a plurality of images that have been uploaded for display within an item listing. For example, each item listing may be associated with one or more images stored in the image-flaw database 260. In some embodiments, the image-flaw database 260 may include different versions of an image.

In some embodiments, the image-flaw database 260 may include a listing of items or categories of items and the likelihood of the item being flawed when listed. For example, the image-flaw database 260 may include an entry that specifies that a certain type of clothing has a high likelihood of having a discoloration. As another example, the image-flaw database 260 may include an entry that specifies that a certain type of electronic device commonly has a scratch. As another example, the image-flaw database 260 may include an entry that specifies that a certain type of handheld device commonly has a defective screen.

In some embodiments, the flaw profile database 265 may include a plurality of digital image filters that may be applied to an image either in real time or prior to being displayed to a user. These digital image filters may include, for example, contrast accentuation digital image filters, color inversion digital image filters, spatial domain digital image filters, and detecting digital image filters, unsharp digital image filters, Laplacian digital image filters, Gaussian digital image filters, smoothing digital image filters, etc.

In some embodiments, the filter database 270 may include data specifying the type of digital image filters that may be used for specific items or categories of items to accent typical flaws in the items or the categories of items. In some embodiments one or more digital image filters may be returned from the filter database 270 and applied to one or more images based on the type of flaw. In some embodiments, one or more digital image filters may be returned from the filter database 270 and applied to one or more images based on the item type or item category.

Modifications, additions, or omissions may be made to the server 120 without departing from the scope of the present disclosure. For example, the computing system 205 and the database 230 may be communicatively coupled by a network, such as the network 115 of FIG. 1. Alternately or additionally, the server 120 may include multiple computing systems 205 that may operate to execute one or more of the processes described in this disclosure.

Figure 3:
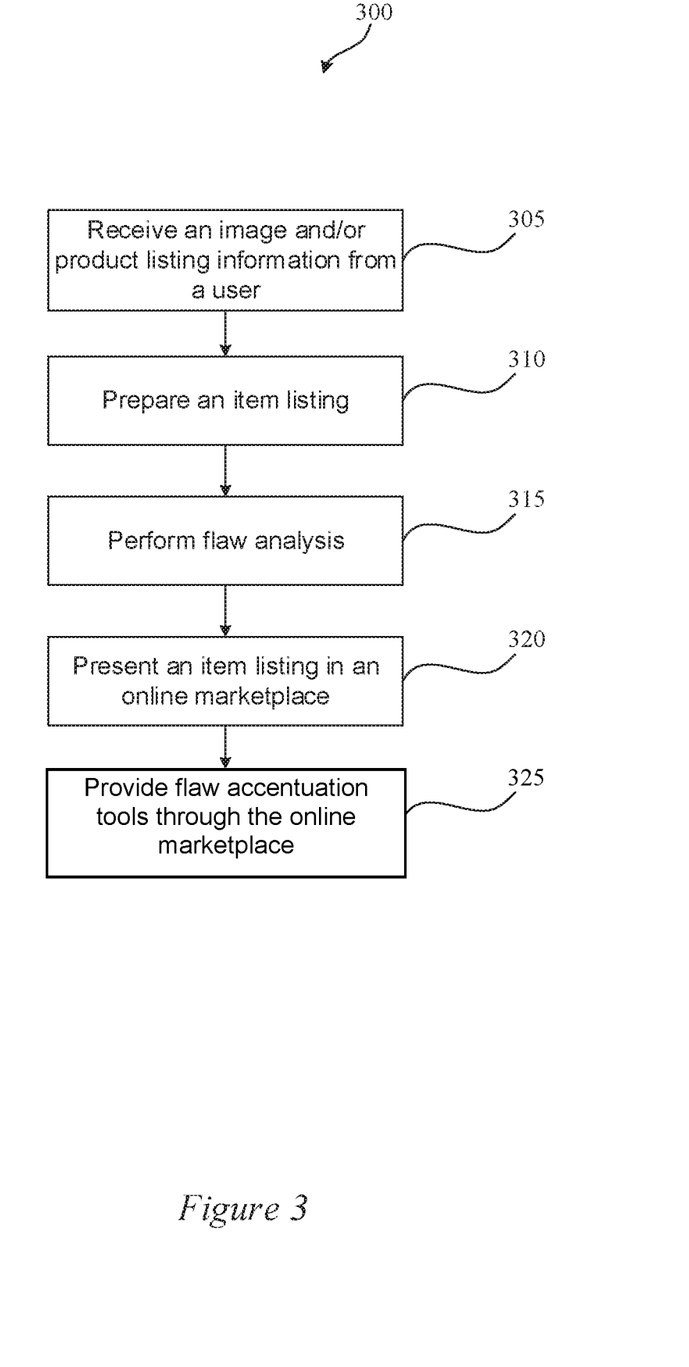
FIG. 3 is a flowchart of an example process for listing an item in an online marketplace according to some embodiments.

FIG. 3 is a flowchart of an example process 300 for listing an item in an online marketplace. One or more steps of the process 300 may be implemented, in some embodiments, by one or more components of the server 120 of FIG. 1 and FIG. 2. Although illustrated as discrete blocks, various blocks may be divided into additional blocks, combined into fewer blocks, performed in a different order, or eliminated, depending on the desired implementation.

Process 300 starts at block 305 where an image and/or product listing information are received at the server 120 from a seller, for example, from the seller through a user device (e.g., the mobile device 105 or the computer 110). The listing information may include a description of the item to be listed for sale in the online marketplace and/or one or more images of the item being listed. The listing information may also include an item type, an item category, etc.

At block 310 the item listing may be created. The item listing, for example, may include a title, a description, the text received from the seller, and/or the images provided by the seller. The item listing may also include, for example, a sales price, an opening bid price, a current price, shipping prices, shipping methods, etc. The item listing may include various other elements or characteristics. The item listing, for example, may be a webpage or series of webpages or other digital media that may be presented to buyers through the online marketplace. The item listing may include an item type and or category that is either provided by the seller or provided by the online marketplace based on the text received from the seller.

At block 315 a flaw analysis may be performed on the images provided by the seller. The flaw analysis, for example, may include performing an item specific or a category specific flaw analysis based on the specific item and or category of item. For example, a specific digital image filter may be applied to the images based on the type of item or the category of item. For example, using the item type or item category the server 120 may identify a typical flaw using the flaw profile database 265. Based on the typical flaw, a digital image filter may be selected from the filter database 270 and applied to the one or more of the images of the item.

As another example, the text provided by the seller may indicate that the item in the item listing includes a certain type of flaw. Based on the certain type of flaw, a digital image filter may be selected from the filter database 270 and applied to the one or more images of the item.

At block 320, the item listing may be presented in the online marketplace. The item listing may include one or more of the original images, one or more digital image filtered images, or a combination thereof. In some embodiments, the digital image filtered images may be available but not provided as part of the item listing. In some embodiments, the item listing may be provided to a plurality of users through a webpage, an app, a mobile app, or an application. In some embodiments, the item listing may be provided in one or more markup language such as, for example, HTML and/or XML.

At block 325, flaw accentuation tools may be provided to the seller through a webpage, an app, and/or an application. For example, as part of the flaw accentuation tool provided to a seller, the seller may be able to click on a link or an image and a digitally filtered image or a digitally filtered portion of an image may be provided. As another example, the user may be provided with tools that allow the user to highlight, circle, zoom into, point to, or flag, etc. one or more portions of an image.

As another example, the flaw accentuation tools may be provided as part of the item listing and may include an original image with a slider bar that allows a user to slide back and forth. For example, as the user (e.g., buyer or seller) slides the slider back-and-forth a digital image filter may be applied to the image and/or portions of the image. As another example, digitally filtered images may be displayed in place of portions or the entire original image. In some embodiments, the slider may increase one or more parameters of the digital filter. For example, if the digital filter is a contrast filter, the slider may be used to increase or decrease the amount of contrast applied to the image. As another example, if the digital filter is an unsharp digital image filter, the slider may be used to increase or decrease the amount of edge accentuation that occurs in the accentuated image by changing parameters (e.g., a scaling constant such as, for example, the k scaling constant) in the filter.

In some embodiments, flaw accentuation tools may allow the user to select various digital image filters that may be applied to portions or the entire original image. For example, a drop down menu or other menu may be provided to the user that allows the user to select one or more digital filters that may be applied to the image. In response, one or more images may be presented through the item listing having the one or more digital filters applied to an image provided by a seller.

In some embodiments, at block 325 the flaw accentuation tools may be provided to the seller. For example, the seller may be able to modify the item listing to include one or more flaw accentuations or flaw accentuation tools in the item listing.

In some embodiments, at block 325 the flaw accentuation tools may be provided to a buyer. For example, the flaw accentuation tools provided to a buyer may allow the buyer to accent one or more images in the item listing. For example, the slider bar discussed above may be provided to allow the buyer to change, modify, and/or apply filters to one or more images.

Figure 4:
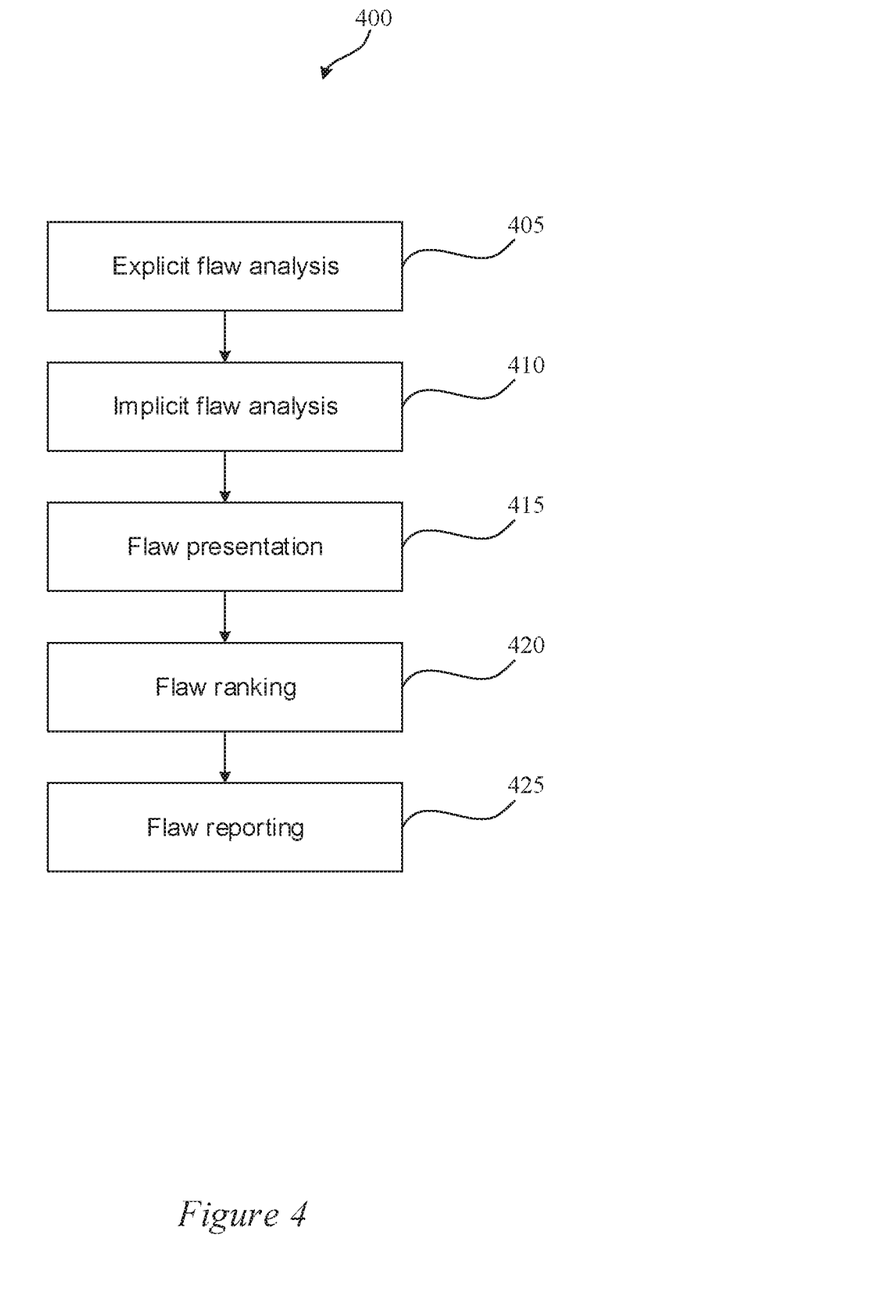
FIG. 4 is a flowchart of an example process providing flaw analysis, flaw presentation, and ranking based on the flaw analysis according to some embodiments.

FIG. 4 is a flowchart of an example process 400 providing flaw analysis, flaw presentation, and ranking based on the flaw analysis. One or more steps of the process 400 may be implemented, in some embodiments, by one or more components of server 120 of FIG. 1 and FIG. 2. Although illustrated as discrete blocks, various blocks may be divided into additional blocks, combined into fewer blocks, performed in a different order, or eliminated, depending on the desired implementation. In some embodiments, only one or a couple of blocks of process 400 may be performed.

Process 400 starts at block 405 where an explicit flaw analysis is performed. An explicit flaw analysis may include any type of flaw identification provided by a seller listing an item for sale in the online marketplace. For example, as part of the listing creation process the seller may be asked whether there is a flaw in the item being listed in the online marketplace. If the seller indicates that there is a flaw on the item, then a user interface may be provided, such as, for example, through a web browser that allows the seller to circle, point to, or highlight the flaw in one or more images of the item being listed for sale in the online marketplace. For example, a drawing tool may be provided to allow the seller to circle the flaw with a line in the image as shown in FIG. 5B. As another example, an ellipse drawing tool may be provided to allow the seller to circle the flaw in the image as shown in FIG. 5C. As another example, an arrow tool may be provided to allow the seller to point to the flaw in the image as shown in FIG. 5D. As another example, a text tool may be provided to allow the seller to add text regarding the flaw in the image as shown in FIG. 5D.

In some embodiments, the explicit flaw analysis 405 may provide a user interface that queries the seller whether the item includes a flaw.

In some embodiments, the explicit flaw analysis 405 may provide a user interface where the seller may upload an additional image. For example, the seller may upload an image that is taken of the specific flaw or is zoomed in to focus on the specific flaw.

In some embodiments, the explicit flaw analysis 405 may provide a user interface that includes a zoom tool. The zoom tool, for example, may be used by the seller to zoom in on the area where the flaw is and/or provide a separate image of the zoomed in area of the flaw.

In some embodiments, the explicit flaw analysis 405 may provide a user interface that includes various digital image filter tools. For example, the user interface may allow the seller to apply one or more digital image filters, for example, selected from the filter database 270 that may highlight or emphasize the flaws in the image. For sample, an image provided by the seller during the online listing process may be provided to the seller in a user interface and one or more buttons or sliders may also be provided allowing the seller to turn on or off one or more digital image filters and/or allowing the seller to increase or decrease the intensity (or another factor) of one or more digital image filters. For example, these digital image filters may include a contrast digital image filter, a color saturation digital image filter, an unsharp digital image filter, a Laplacian digital image filter, a Gaussian digital image filter, a smoothing digital image filter, etc. These digital image filters may include any digital image filter located in the filter database 270.

At block 410 an implicit flaw analysis may be performed. In some embodiments, an implicit flaw analysis may be conducted by the server 120 in response to information provided by the seller in text and/or image format. In some embodiments, an implicit flaw analysis may be conducted by the server 120 without interaction with the seller. In some embodiments, the implicit flaw analysis 410 may flag the item as flawed based on text entered by the seller, the type of item being listed, the item category of the item, or an analysis performed on one or more images of the item provided by the seller.

In some embodiments, an implicit flaw analysis 410 may flag the item as flawed if the seller enters text into the description of the item indicating that the item may have flaws. For example, an implicit flaw analysis may flag the item as flawed if any terms associated with a flaw or derivatives thereof appear in the description of the item. These terms may include, for example, "damaged", "ding", "scratch", "dent", "discoloration", "faded", "soiled", "used", "old", "stained", "damage", "hole", "water damage", "chip", "defect", etc.

In some embodiments, the totality of the description may be used to limit whether to trigger an implicit flaw analysis. For example, if the item is a golf club and the term "chip" is used in the description, it is likely used to describe the type of golf club rather than any flaw in the golf club. As another example, if the item is listed as an antique, then it may be assumed to have flaws and, therefore, may not trigger the implicit flaw analysis despite using terms associated with a flaw.

In some embodiments, an implicit flaw analysis 410 may flag the item as flawed based on the item type or the category of the item. For example, some items, item types, or categories of items may be more or less likely to have a flaw. The flaw profile database 265, for example, may include a listing of items, item types, or categories of items that are typically associated with a flaw. If the item, item type, or category of item matches the listing of items, item types, or categories of items in the flaw profile database 265 associated with items likely to have a flaw, then the implicit flaw analysis may flag the item as flawed.

In some embodiments, an implicit flaw analysis 410 may flag the item as flawed if an analysis of an image indicates that the image may have been altered or may indicate that the item is flawed. For example, the implicit flaw analysis 410 may use a digital image filter (e.g., from the filter database 270) and/or image forensic analysis to determine whether the image has been altered with photo-editing software. The digital image filter and/or image forensic analysis, for example, may use an error level analysis (ELA) tool that can determine the amount of difference that occurs during a JPEG resave. Various other techniques may also be used. In some embodiments, the implicit flaw analysis 410 may determine whether a digital image filter and/or image forensic analysis has been applied to an image to decrease the likelihood that a flaw may be seen by a potential buyer.

As another example, the implicit flaw analysis 410 may review the metadata associated with the image to determine whether the image has been altered by photo editing software. The metadata indicates that the image was last saved by a photo editing application such as, for example, Photoshop, Illustrator, Corel Draw, Pixlr, Serif PhotoPlus, Acorn, GIMP, Affinity Photo, Adobe Lightroom, ACDSee, Corel PaintShop, Aperture, DxO Optics, Pixelmator, etc. Some images, for example, may include XMP metadata that may include a history field. If the history field indicates that the image was saved multiple times, then the image was likely modified. In some embodiments, the implicit flaw analysis may check whether the image includes an XMP metadata history field with entries above a threshold. If it does, then the image may be determined to have been altered.

In some embodiments, the presence of XMP metadata itself may indicate that the image was opened and/or saved by an Adobe® product and may indicate that the image was edited by an Adobe® product such as, for example, Photoshop. In some embodiments, the implicit flaw analysis may check whether the image includes XMP metadata. If it does, then the image may be determined to have been altered.

In some embodiments, the implicit flaw analysis 410 may use an online third-party forensic analysis service to determine whether an image was altered. For example, the image may be uploaded to a webpage that performs forensic analysis such as, for example, www.fotoforensics.com, www.imageforensic.org, www.izitru.com, imageedited.com, etc. The implicit flaw analysis 410 may determine whether the image has been altered based on the results provided by the third party webpage.

In some embodiments, an implicit flaw analysis 410 may flag the item as flawed if it is determined that the image includes effects known to be indicative of a digitally modified image such as, for example, if the image includes rainbowing, etc. The image may be processed to determine whether it was digitally modified using any number of techniques such as, for example, error level analysis, principal component analysis, PCA cross-product, etc. Error level analysis, for example, compares separation between the red and blue color channels in the image. Principal component analysis (PCA), for example, identifies an orthogonal coordinate system based on the variance of the data space. The PCA cross-product can compare the various features of the image between the PCA vector and another image vector such as a vector from the center of a color cloud to a specific color.

In some embodiments, if the implicit flaw analysis 410 may determine that the image has been altered, the marketplace may provide a prompt asking the seller to provide a new image of the item.

In some embodiments, the implicit flaw analysis 410 may compare the image of the item being listed with one or more images of the same item or item type and determine whether any variations between the two images indicate a flaw in the item being listed. The one or more images of the same item or item type may be extracted, for example, from the listing database 255. The comparison between the two images may provide an indication that the image being listed includes a flaw. Prior to making a comparison, for example, the two images may be scaled so they are the same size and/or background or foreground item may be removed. The difference in value of each pixel may be calculated. The areas where there is a concentration of different values above a predetermined threshold may indicate a flaw in the image of the item being listed.

Figure 5A:
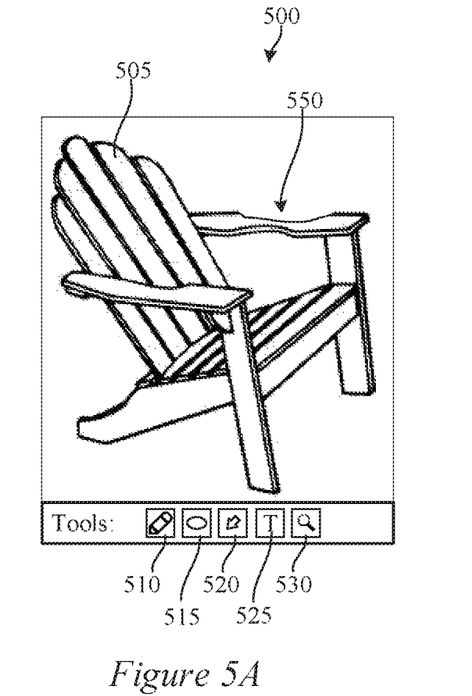
FIGS. 5A, 5B, 5C, and 5D illustrate examples of a user interface for flaw marking and/or flaw presentation according to some embodiments.
Figure 5B:
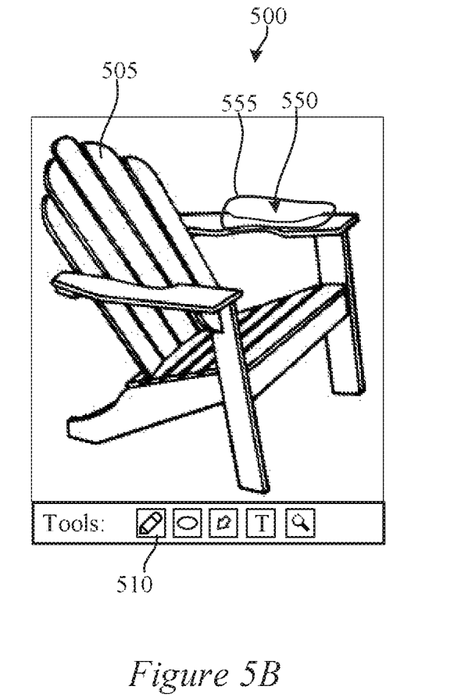
Figure 5C:
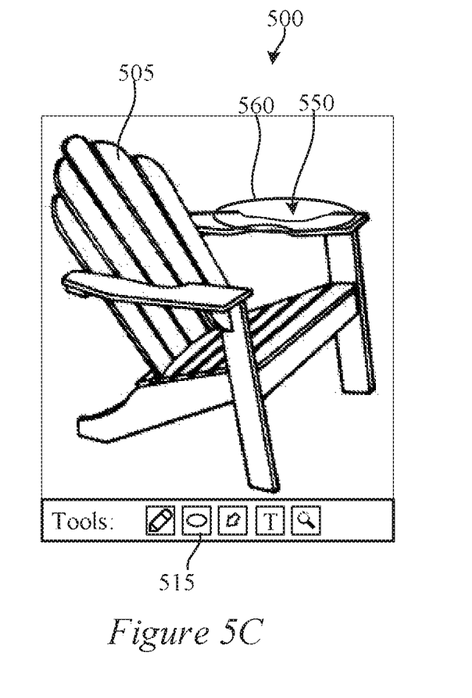
Figure 5D:
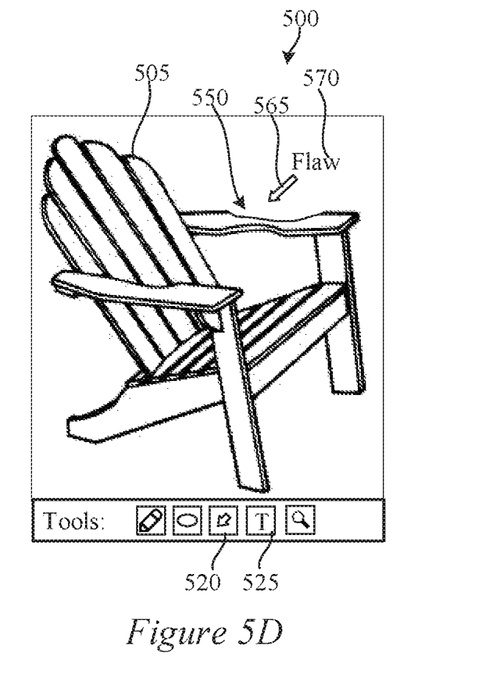

FIGS. 5A, 5B, 5C, and 5D illustrate examples of a user interface for flaw marking and/or flaw presentation according to some embodiments. In FIG. 5A item 505 is presented to a user interface 500 and has flaw 550. In this example, item 505 is an Adirondack chair and the flaw is a gouge in the arm rest in the chair. A number of tools are provided to the seller through the user interface: a drawing tool 510, a circle tool 515, an arrow tool 520, a text tool 525, and a zoom tool 530. Various other tools may be included. While a number of tools are shown in FIG. 5A, some of these tools may or may not be included in the user interface 500.

FIGS. 5B, 5C, and 5D each show an example where the seller has indicated a flaw in an image of the item being listed for sale. FIG. 5B shows a circle 555 drawn around the flaw 550 by the seller using the draw tool 510. FIG. 5C shows a circle 560 drawn around the flaw 550 by the seller using the circle tool 515. FIG. 5D shows an arrow 565 pointing to the flaw 550 and text 570 identifying the flaw. The arrow 565 may have been drawn with the arrow tool 520 and the text 570 may have been added using the text tool 525.

Figure 6:
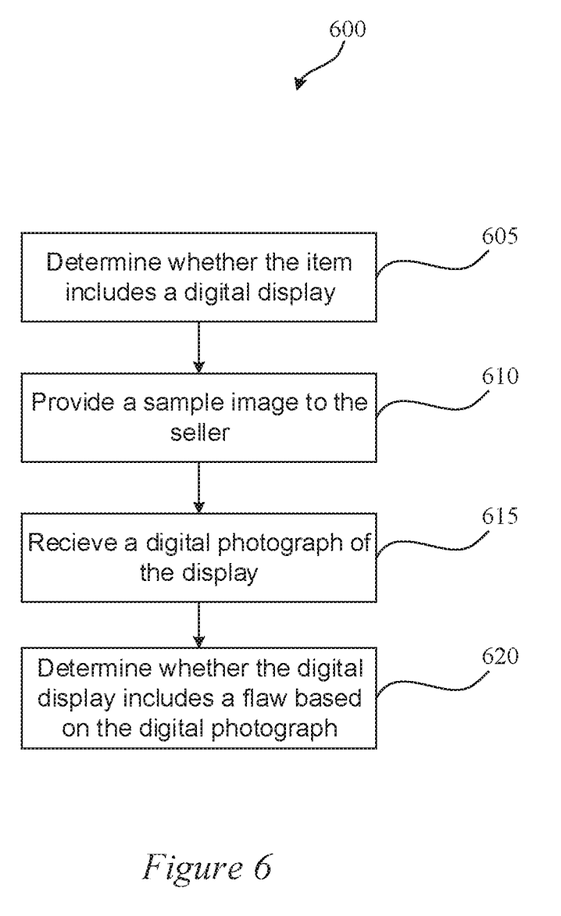
FIG. 6 is a flowchart of a process for performing flaw analysis for an item that includes a digital display according to some embodiments.

In some embodiments, the implicit flaw analysis 410 may determine whether a digital display has a flaw using, for example, process 600 shown in FIG. 6. One or more steps of the process 600 may be implemented, in some embodiments, by one or more components of server 120 of FIG. 1 and FIG. 2. Although illustrated as discrete blocks, various blocks may be divided into additional blocks, combined into fewer blocks, performed in a different order, or eliminated, depending on the desired implementation. In some embodiments, only one or a couple of blocks of process 600 may be performed.

Process 600 starts at block 605 where it may be determined whether the item includes a digital display. For example, it can be determined if the item includes a digital display based on keywords found in the text, the item type, the item category, etc. For example, if the item is a computer, a television, a mobile phone, a tablet, etc., then it can be assumed to include a digital display.

At block 610 process 600 may provide the seller with a sample image to display on the digital display of the item. For example, the seller may be directed to a specific webpage or provided with a specific file of the sample image that may be displayed on the digital display of the item.

At block 615 a digital photograph of the sample image may be received from the seller. For example, the seller may be directed to take a digital image of the digital display of the item while the digital display is displaying a sample image. A user interface may be provided to the seller that allows the seller to upload a digital photograph of the display displaying the sample image. In response, the seller may upload a digital photograph.

At block 620, a comparison between the digital photograph and the sample image may be made. For example, a pixel by pixel or region by region comparison of the digital photograph with the sample image may be made. For example, the process 600 may take an average of regions of the digital photograph and compare these values with an average of a corresponding region of the sample image. If the difference between a region of the sample image and a region of the digital photograph is greater than a threshold value, then the region of the display corresponding to the comparison may be flawed.

The threshold value, in some embodiments, may be determined based on an average difference between the pixels of the digital photograph and the sample image. For example, the threshold value may be greater than the average difference between the pixels of the digital photograph and the sample image.

In some embodiments, an identified flaw may be presented or highlighted to buyers (or sellers) at the online marketplace at block 415 in any of a number of different ways. For example, one or more additional images may be provided in the item listing of the online marketplace that identifies the flaw, highlights the flaw, helps the flaw stand out, etc. For example, these one or more images may include the image uploaded by the seller and altered in such a way as to identify the flaw, highlight the flaw, help the flaw stand out, etc. The images, for example, may be an image of a zoomed portion of the image that includes the flaw, the image may have a digital image filter applied to the image from the filter database 270 that may better show the flaw relative to other portions of the image, the image may include one or more lines circling the flaw (see FIGS. 5B & 5C), the image may include one or more lines or arrows pointing to the flaw (see FIG. 5D), the image may include text describing the flaw, etc.

In some embodiments, a flaw highlight tool may be provided in a user interface in conjunction with an image of the item. The flaw highlight tool may allow the seller to interact with the image to highlight flaws within the image. For example, when the user passes the flaw tool over a portion of the image in the user interface, a digital image filter may be applied to the image that highlights one or more flaws. Alternatively or additionally, as the user passes the flaw tool over a portion of the image in the user interface, at least a portion of a second image of the item may be displayed in the user interface. The second image of the item may be an image that has had a digital image filter applied to the image that can highlight flaws in the image. The digital image filter, for example, may be a digital image filter selected from the filter database 270. A buyer may be able to select the flaw tool and by interacting with the image the buyer may be able to view highlighted flaws within the image.

As another example, the flaw highlight tool, for example, may include one or more slider widgets in the user interface. The user may interact with the one or more slider widgets to change the type, amount, and/or the location of digital image filtering applied to the image. The digital image filter, for example, may be a digital image filter selected from the filter database 270. For example, as the user moves a slider widget in the user interface the image may be more or less processed in real time. As another example, as the user moves a slider widget in the user interface the amount of processing of the image may increase or decrease in accordance with the position of the slider widget. As another example, as the user moves a slider widget in the user interface the location of the processing in the image may change in accordance with the position of the slider widget.

In some embodiments, a ranking of the item listing in the online marketplace may be changed 420 based on the explicit flaw analysis 405 and/or the implicit flaw analysis 410. Rankings indicate the order in which an item listing may be presented with respect to other item listings to buyers in response to a search query. Often, the more relevant the item is to the search query, the higher the ranking and the more likely a potential buyer may view and purchase the item. Other factors that may affect rankings may include, for example, the relevance of the item and the search terms, the amount of text provided by the seller, the price of the item, the number of images provided by the seller, the rating of the seller, or the rating of items having the same or similar item types, etc.

In some embodiments, sellers may be encouraged and/or positively reinforced to positively indicate that an item includes flaws and/or to provide some type of an indication of the flaw. For example, if a flaw is indicated in the explicit flaw analysis 405, and the seller does not provide any additional images of the item, or provide any flaw accentuations to an image, etc., then the listing may be provided with a lower ranking than a seller that provides additional images of an item and/or applies any flaw accentuations to the image of the item. Alternatively or additionally, an item listing may lose a predetermined number of ranking points in response to a seller that does not provide any additional images of the item, or provide any flaw accentuations to an image, etc.

In some embodiments, an item listing may gain a predetermined number of ranking points in response to a seller that does provide any additional images of the item and/or provides any flaw accentuations to an image, etc.

In some embodiments, an item listing may gain ranking points if it is determined that the item, item type, or item category is consistent with an item, an item type, and/or a category that typically is associated with a flaw, yet no flaw is identified by the seller in the implicit flaw analysis 410 and/or in the explicit flaw analysis 405. Alternatively, in some embodiments, an item listing may lose ranking points if it is determined that the item, item type, or item category is consistent with an item, an item type, and/or a category that typically is associated with a flaw, yet no flaw is identified by the seller in the implicit flaw analysis 410 and/or in the explicit flaw analysis 405.

In some embodiments, the magnitude of a ranking increase may be proportional to the number of flaw accentuations provided by the seller. For example, if the seller provides multiple flaw accentuations to one or more images, the ranking of the item in a search query may be increased by more ranking points in comparison to if the seller provided a single flaw accentuation or no flaw accentuation.

In some embodiments, the ranking of the item in a search query may be increased if the seller provides one or more images of the flaw.

In some embodiments, if it is determined in the implicit flaw analysis 410 that the image of an item has been altered, then the item ranking may be decreased a predetermined number of points. Alternatively or additionally, in some embodiments, if it is determined in the implicit flaw analysis 410 that the image of an item has been altered, then the item may not be offered for sale in the online marketplace or removed from the online marketplace. Alternatively or additionally, in some embodiments, the rating of the seller may be reduced a predetermined number of points if it is determined that an image of an item has been altered. Alternatively or additionally, in some embodiments, the item may be listed for sale in the online marketplace with an indication such as, for example, text and/or an image, indicating that one or more of the images has been altered by the seller.

Some embodiments include digital image filters that may be used to determine whether an image includes a flaw. These digital image filters or algorithms applying the digital image filter, for example, may be stored in the filter database 270. Any number or type of digital image filters maybe applied to an image to determine whether the image includes a flaw or to process the image to highlight any potential flaws.

In some embodiments, a training set of previously listed items with a flaw may be used to identify digital image filters that produce digital image filtered images that highlight specific types of flaws. A machine learning algorithm such as, for example, a support vector machine, a neural net, or other supervised learning models, can be used to associate digital image filters with specific flaws. In some embodiments, the machine learning algorithm can act on item listings (e.g., previously listed items) in the listing database 255. For example, the machine learning algorithm can be applied to a set of item listings that are known to include a flaw and/or have a flaw identified in one or more images. The set of item listings may also include an indication of the type of flaw on the item. The machine learning algorithm can iteratively apply one or more digital image filters to each image in the set of item listings and based on user feedback, image analysis, or image comparison, the best digital image filter can be determined. The machine learning algorithm may then associate the best digital image filter with the item type and/or associate the best digital image filter with the type of flaw. The machine learning algorithm, for example, may provide a database that associates digital image filters with item type and/or flaw type, etc. The database, for example, may grow or be revised as more item listings are analyzed over time. The database may be stored, for example, in the filter database 270.

Some embodiments may include a method for providing flaw accentuation to an image in an e-commerce online marketplace. The method may include receiving at an online marketplace, from a seller through the Internet, an image of an item being listed for sale at the online marketplace; providing a first user interface to the seller through the Internet that allows the seller to indicate whether the item has one or more flaws. In response to the user indicating through the first user interface that the item has one or more flaws, providing the seller with one or more digital flaw accentuation tools through the first user interface; receiving through the first user interface a flaw accentuation to the image that is based on an interaction between the seller and a flaw accentuation tool; and creating a listing in the online marketplace for the item that includes the image and an application of the flaw accentuation to the image.

In some embodiments, the flaw accentuation to the image comprises an indication from the user to apply a digital image filter to the image creating a second image; and/or the application of the flaw accentuation comprises displaying the image and providing a tool to the buyer that allows the buyer to manipulate a user interface item that alternatively displays portions of the second image in place of the first image.

In some embodiments, the accentuation tool may include at least one tool selected from the group consisting of: a lasso tool, a line drawing tool, an ellipse drawing tool, a text tool, an arrow tool, a zoom tool, and a digital image filter application tool.

In some embodiments, the flaw accentuation to the image may include an accentuation selected from the group consisting of: providing a line around a flaw, insertion of text into the image, insertion of an arrow into the image, zooming into a portion of the image, and applying a digital image filter to the image.

In some embodiments, applying a digital image filter to the image may include applying a digital image filter selected from the list consisting of a contrast accentuation digital image filter, color inversion digital image filter, spatial domain digital image filter, and detecting digital image filters, unsharp digital image filter, Laplacian digital image filter, Gaussian digital image filter, and smoothing digital image filter.

In some embodiments, the flaw accentuation to the image is provided in a second image comprising the image and the flaw accentuation.

The term "substantially" means within 5% or 10% of the value referred to or within manufacturing tolerances.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing art to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical, electronic, or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for-purposes of example rather than limitation, and does not preclude inclusion of such modifications, variations, and/or additions to the present subject matter as would be readily apparent to one of ordinary skill in the art.

What is claimed is:

1. A method for providing flaw accentuation to a digital image, the method comprising:
   receiving, at one or more servers, an image of an item and an indication of an item type of the item, as part of an item listing on an electronic marketplace;
   identifying one or more flaw types in a database as being correlated with the item type;
   applying one or more digital filters to the image of the item;
   determining, based at least in part on the applying of the one or more digital filters to the image and the one or more flaw types, that the item includes a flaw;
   in response to the determining that the item includes the flaw, providing, via a user interface, one or more flaw accentuation tools, the one or more flaw accentuation tools operable to accentuate the flaw in the image of the item;
   receiving, via the one or more flaw accentuation tools, a modification to the image, the modification highlighting the flaw in the image;
   generating an accentuated image of the item; and
   generating the item listing of the item for sale in the electronic marketplace, wherein the item listing comprises at least one of the image of the item or the accentuated image of the item.

2. The method of claim 1, further comprising:
   receiving, with the item listing, an item description that indicates that the item is damaged, wherein the applying of the one or more digital filters to the image of the item is based at least in part on the item description that indicates that the item is damaged.

3. The method of claim 1, wherein the applying of the one or more digital filters to the image of the item comprises:
   applying the one or more digital filters to at least a portion of the image to at least one of detect or accent deviations in a condition of the item corresponding to the flaw.

4. The method of claim 1, wherein the one or more flaw accentuation tools comprise a drawing tool, a circle tool, or an arrow tool.

5. The method of claim 4, wherein generating the accentuated image of the item comprises:
   adding an encirclement around the flaw or adding an arrow pointing at the flaw in the image of the item based at least in part on the modification to the image via one of the drawing tool, the circle tool, or the arrow tool.

6. The method of claim 1, wherein the one or more flaw accentuation tools comprise a text tool, and wherein generating the accentuated image of the item comprises:
   overlaying text on the image of the item based at least in part on input received via the text tool.

7. The method of claim 1, wherein the one or more flaw accentuation tools comprise a selectable set of digital image filters, and further comprising:
   presenting, via the user interface, the selectable set of digital image filters; and
   receiving a selection of a digital image filter from the selectable set of digital image filters, wherein the modification to the image is based at least in part on the selection of the digital image filter.

8. The method of claim 7, wherein the selectable set of digital image filters comprise at least one of a contrast accentuation digital image filter, a color inversion digital image filter, a spatial domain digital image filter, detecting digital image filters, an unsharp digital image filter, a Laplacian digital image filter, a Gaussian digital image filter, or a smoothing digital image filter.

9. A system, comprising:
one or more processors;
a network interface; and
memory including instructions that, upon execution by the one or more processors, cause the system to perform operations comprising:
receiving an image of an item and an indication of an item type of the item, as part of an item listing on an electronic marketplace;
identifying one or more flaw types in a database as being correlated with the item type;
applying one or more digital filters to the image of the item;
determining, based at least in part on the applying of the one or more digital filters to the image and the one or more flaw types, that the item includes a flaw;
in response to the determining that the item includes the flaw, providing, via a user interface, one or more flaw accentuation tools, the one or more flaw accentuation tools operable to accentuate the flaw in the image of the item;
receiving, via the one or more flaw accentuation tools, a modification to the image, the modification highlighting the flaw in the image;
generating an accentuated image of the item; and
generating the item listing of the item for sale in the electronic marketplace, wherein the item listing comprises at least one of the image of the item or the accentuated image of the item.

10. The system of claim 9, wherein the operations further comprise:
receiving, with the item listing, an item description that indicates that the item is damaged, wherein the applying of the one or more digital filters to the image of the item is based at least in part on the item description that indicates that the item is damaged.

11. The system of claim 9, wherein instructions for the applying of the one or more digital filters to the image of the item, upon execution by the one or more processors, further cause the system to perform operations comprising:
applying the one or more digital filters to at least a portion of the image to at least one of detect or accent deviations in a condition of the item corresponding to the flaw.

12. The system of claim 9, wherein the one or more flaw accentuation tools comprise a drawing tool, a circle tool, or an arrow tool.

13. The system of claim 12, wherein instructions for the generating of the accentuated image of the item, upon execution by the one or more processors, further cause the system to perform operations comprising:
adding an encirclement around the flaw or adding an arrow pointing at the flaw in the image of the item based at least in part on the modification to the image via one of the drawing tool, the circle tool, or the arrow tool.

14. The system of claim 9, wherein the one or more flaw accentuation tools comprise a text tool, and wherein generating the accentuated image of the item comprises:
overlaying text on the image of the item based at least in part on input received via the text tool.

15. The system of claim 9, wherein the one or more flaw accentuation tools comprise a selectable set of digital image filters, and wherein the operations further comprise:
presenting, via the user interface, the selectable set of digital image filters; and
receiving a selection of a digital image filter from the selectable set of digital image filters, wherein the modification to the image is based at least in part on the selection of the digital image filter.

16. The system of claim 15, wherein the selectable set of digital image filters comprise at least one of a contrast accentuation digital image filter, a color inversion digital image filter, a spatial domain digital image filter, detecting digital image filters, an unsharp digital image filter, a Laplacian digital image filter, a Gaussian digital image filter, or a smoothing digital image filter.

17. A non-transitory computer-readable medium storing code comprising instructions executable by one or more processors to cause a system to perform operations comprising:
receiving an image of an item and an indication of an item type of the item, as part of an item listing on an electronic marketplace;
identifying one or more flaw types in a database as being correlated with the item type;
applying one or more digital filters to the image of the item;
determining, based at least in part on the applying of the one or more digital filters to the image and the one or more flaw types, that the item includes a flaw;
in response to the determining that the item includes the flaw, providing, via a user interface, one or more flaw accentuation tools, the one or more flaw accentuation tools operable to accentuate the flaw in the image of the item;
receiving, via the one or more flaw accentuation tools, a modification to the image, the modification highlighting the flaw in the image;
generating an accentuated image of the item; and
generating the item listing of the item for sale in the electronic marketplace, wherein the item listing comprises at least one of the image of the item or the accentuated image of the item.

18. The non-transitory computer-readable medium of claim 17, wherein the instructions are further executable by the one or more processors to cause the system to perform operations comprising:
receiving, with the item listing, an item description that indicates that the item is damaged, wherein the applying of the one or more digital filters to the image of the item is based at least in part on the item description that indicates that the item is damaged.

19. The non-transitory computer-readable medium of claim 17, wherein the instructions for the applying of the one or more digital filters to the image of the item, upon execution by the one or more processors, further cause the system to perform operations comprising:
applying the one or more digital filters to at least a portion of the image to at least one of detect or accent deviations in a condition of the item corresponding to the flaw.

20. The non-transitory computer-readable medium of claim 17, wherein the one or more flaw accentuation tools comprise a drawing tool, a circle tool, or an arrow tool.

* * * * *